US011112992B2

(12) United States Patent
Hayashida

(10) Patent No.: US 11,112,992 B2
(45) Date of Patent: Sep. 7, 2021

(54) APPARATUS AND NON-TRANSITORY COMPUTER READABLE MEDIUM

(71) Applicant: FUJIFILM BUSINESS INNOVATION CORP., Tokyo (JP)

(72) Inventor: Toshiharu Hayashida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/785,709

(22) Filed: Feb. 10, 2020

(65) Prior Publication Data

US 2021/0081113 A1 Mar. 18, 2021

(30) Foreign Application Priority Data

Sep. 12, 2019 (JP) .............................. JP2019-166365

(51) Int. Cl.
*G06F 3/06* (2006.01)
(52) U.S. Cl.
CPC ............ *G06F 3/065* (2013.01); *G06F 3/0619* (2013.01); *G06F 3/0673* (2013.01)
(58) Field of Classification Search
CPC ....... G06F 3/065; G06F 3/0673; G06F 3/0619
See application file for complete search history.

(56) References Cited

U.S. PATENT DOCUMENTS

| 6,286,032 B1 * | 9/2001 | Oberlander ........... H04L 63/123 |
| | | 709/203 |
| 2009/0328218 A1 * | 12/2009 | Tsurukawa ............ H04L 9/3247 |
| | | 726/23 |

(Continued)

FOREIGN PATENT DOCUMENTS

| JP | 2013-103411 A | 5/2013 |
| JP | 2019-016857 A | 1/2019 |

*Primary Examiner* — Hiep T Nguyen
(74) *Attorney, Agent, or Firm* — Oliff PLC

(57) ABSTRACT

An apparatus includes a generating unit and a copy unit. The generating unit generates and outputs first backup data including an information processing component and processing specifying information. The information processing component is included in the apparatus and includes identification information of a save area storing processing result data obtained through execution of a process defined by the information processing component. The processing specifying information uniquely identifies a process which is to be applied to the processing result data stored in the save area. The save area is included in the apparatus and is indicated by the identification information. When a person inputs an instruction to copy second backup data to the apparatus, if a first process matches a second process, the copy unit copies the information processing component in the second backup data to the apparatus. The second backup data is generated by the generating unit of a different apparatus. The first process is applied to processing result data stored in a first save area. The first save area is included in the apparatus and is indicated by the identification information included in the information processing component in the second backup data. The second process is identified by using the processing specifying information included in the second backup data. If the first process is different from the second process, the copy unit transmits a notification to the person.

10 Claims, 13 Drawing Sheets

(56) References Cited

U.S. PATENT DOCUMENTS

| | | | |
|---|---|---|---|
| 2010/0023717 A1* | 1/2010 | Jinno | G06F 3/067 |
| | | | 711/162 |
| 2010/0146231 A1* | 6/2010 | Gopalan | G06F 11/1458 |
| | | | 711/162 |
| 2017/0346636 A1* | 11/2017 | Hernacki | H04W 12/041 |
| 2018/0013915 A1* | 1/2018 | Tajima | H04N 1/0097 |
| 2019/0012124 A1 | 1/2019 | Muraishi | |
| 2020/0311270 A1* | 10/2020 | Gryaznov | G06F 21/566 |

\* cited by examiner

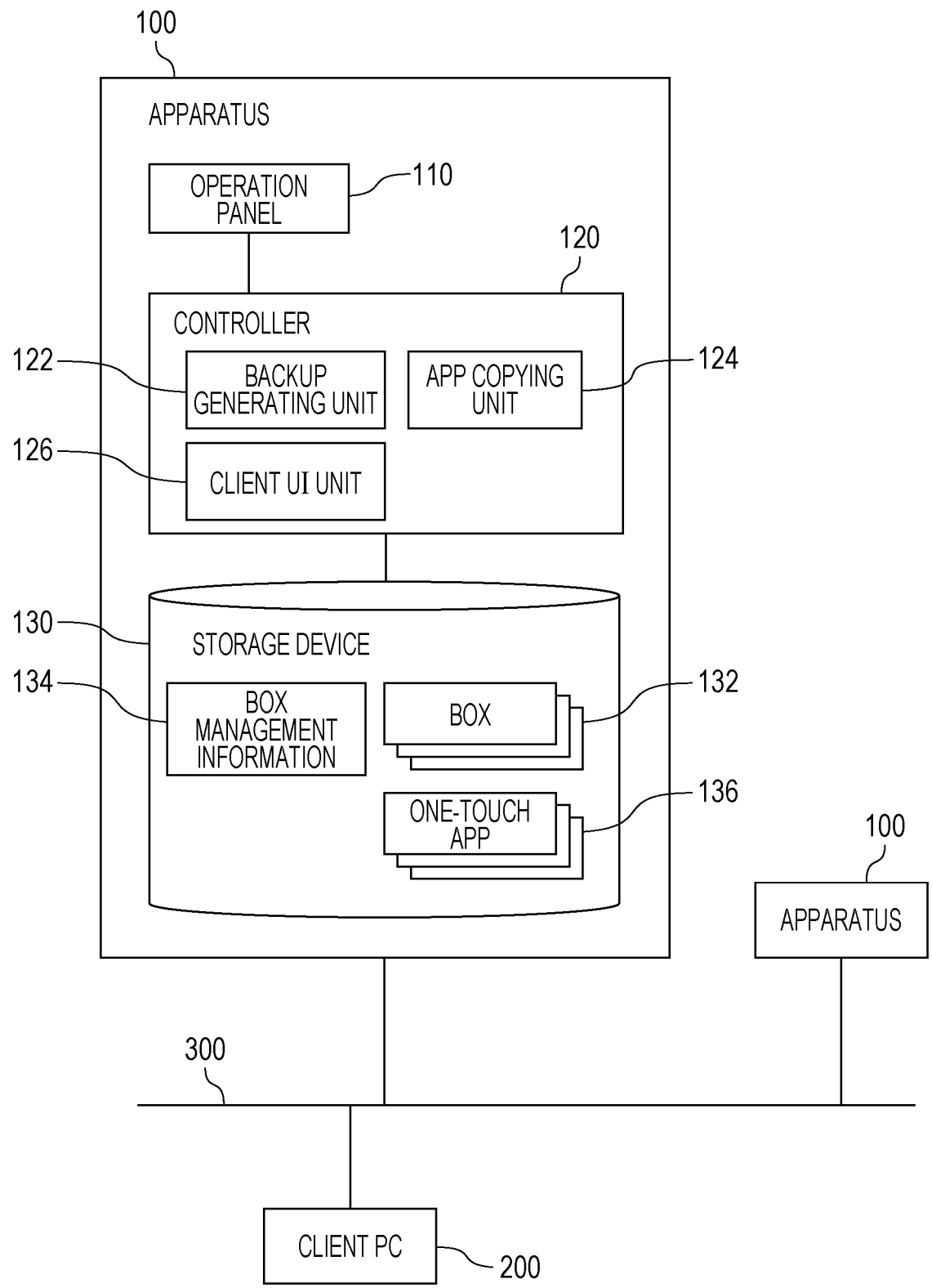

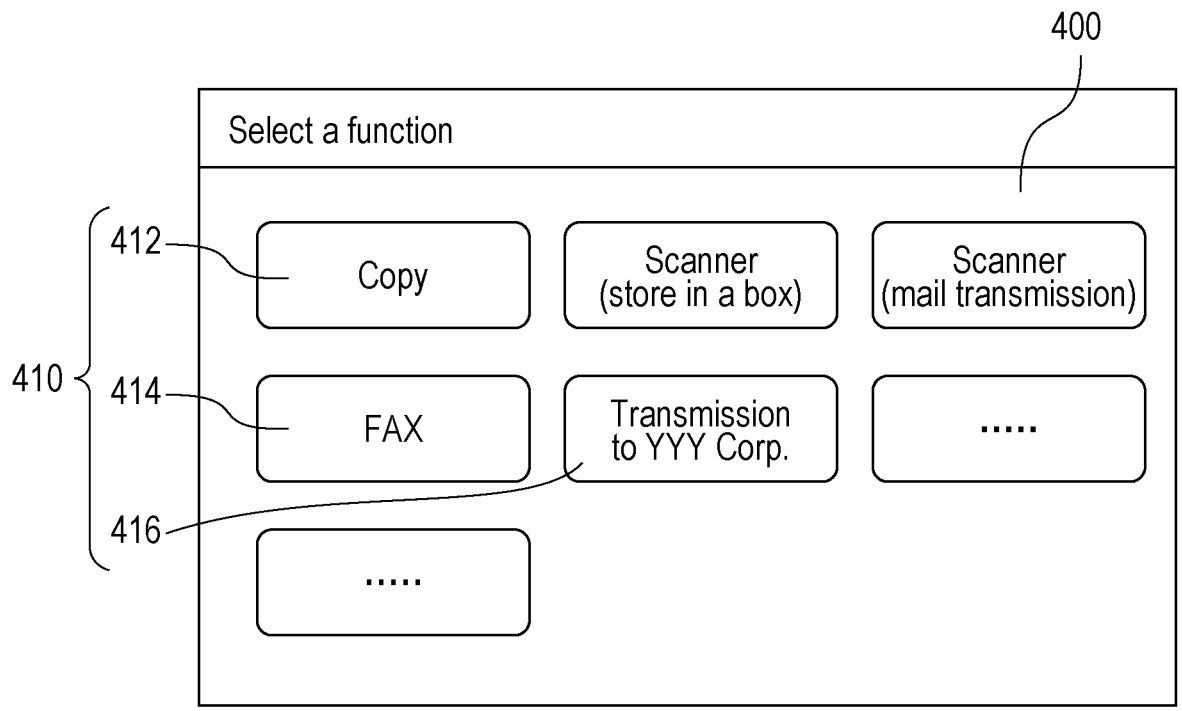

FIG. 4

| INSTRUCTION DESCRIPTION 001 | |
|---|---|
| ITEM NAME | CONTENT |
| NAME | FOR TRANSMISSION TO YYY CORP. |
| UPDATE DATE AND TIME | 2019/06/25 |
| OWNER | User003 |
| DESCRIPTION | FOR FAX TRANSMISSION TO YYY CORP. |
| HASH VALUE | 7ADBE391489ED2E.......... |
| PROCESSING CONTENT | <CODES INDICATING PROCESSING CONTENT> |
| FAX | 03-xxxx-yyyy |
| Mail | TRANSMISSION TO admin@example.com |
| FTP | NO |
| Print | NO |
| ...... | ...... |

APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-166365 filed Sep. 12, 2019.

BACKGROUND (i) Technical Field

The present disclosure relates to an apparatus and a non-transitory computer readable medium.

(ii) Related Art

The following technique is being used: apparatuses such as a multi-function device (an apparatus having a combination of the functions of a printer, a scanner, a fax, and the like) include logical save areas, which are called, for example, confidential boxes or security boxes and in which data, such as fax data, scan data, or print data, is stored. Such save areas described above are prepared. Passwords and authorized users are set to the save areas, enabling users, who may access corresponding save areas, to be limited.

In addition, the following technique is being used: a save area is associated with a user who may access the save area. Such a user is called an owner, an access right holder, or the like of the save area.

Another known mechanism is such that a save area such as a confidential box is associated with a process performed on data stored in the save area. Examples of the mechanism include a multi-function device in which a type of program, which is called an "instruction description" or a "job flow", may be set to confidential boxes. In storage of data in a confidential box, this type of multi-function device performs a process, which is indicated by an instruction description which is set to the confidential box, on the data in one of the following manners: automatically; after transmission of a user's explicit instruction for execution; after satisfaction of an execution condition which is set in advance.

Another known apparatus has a function of receiving registration of information processing components defining processing content, and executing an information processing component specified as an execution target by a user among the registered information processing components. For example, Japanese Unexamined Patent Application Publication No. 2019-16857 discloses a mechanism in which processing execution data called one-touch apps, in which procedures to be performed are registered in advance, is registered in an image forming apparatus; instructions to execute one-touch apps are received from users. A one-touch app is an example of the information processing component described above.

Another known apparatus has a function of associating an information processing component, which defines processing content, with a save area which serves as a storage destination of data obtained through the processing.

Japanese Unexamined Patent Application Publication No. 2019-16857 discloses a technique for addressing some problems arising when a one-touch app generated for a certain image forming apparatus is subjected to copying (also called cloning) to a different image forming apparatus in which the copied one-touch app is used. This technique addresses the problem in that, when the one-touch app uses a function which is supported by the copy-source apparatus and which is not supported by the copy-destination apparatus, the one-touch app does not operate normally in the copy-destination apparatus. In addition, this technique addresses a problem in that, when the one-touch app includes specification of parameters (for example, a print density) of an image forming apparatus, the individual difference in performance between the image forming apparatuses causes a situation in which a desired processing result is obtained in the copy-source apparatus by using the parameters of the one-touch app, but not in the copy-destination apparatus.

Japanese Unexamined Patent Application Publication No. 2013-103411 discloses a method for restoring setting values without error with no increase in a user's time and effort even when the number of apparatus models is increased. In this method, setting information and identification information for recognizing the type of the image forming apparatus body are backed up in an external storage medium. In a restore, it is determined whether or not setting information is to be corrected. If setting information is to be corrected, the correction is made. In accordance with the correction, items that are to be subjected to a user's check and modification are selected automatically, and are presented to the user.

For example, as in the case in which a certain apparatus is replaced with a new apparatus, it may be convenient that an information processing component registered in a first apparatus is copied to a second apparatus which is different from the first apparatus. If the information processing component associated with the save area corresponding to certain identification information (which is referred to as first identification information) in the first apparatus is simply copied to the second apparatus, the information processing component is associated with a save area which is included in the second apparatus and which corresponds to the same first identification information.

A program, which is set to the save area that corresponds to the first identification information and that is included in the second apparatus, may define a process different from that for a program which is set to the save area which corresponds to the first identification information and which is included in the first apparatus. In this case, when the information processing component, having been copied to the second apparatus, is executed, data is stored in the save area in the second apparatus through the execution, and the process, which is different from that performed on data when the information processing component is executed in the first apparatus, is performed on the stored data. Therefore, a state, which is not expected by a first user, may occur through execution of the information processing component in the second apparatus.

SUMMARY

Aspects of non-limiting embodiments of the present disclosure relate to a mechanism for preventing execution of a process which is different from the process that is set to a save area associated with an information processing component in a certain apparatus and which is performed on data stored in a save area in a different apparatus through execution of the information processing component having been copied from the certain apparatus to the different apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an apparatus including a generating unit and a copy unit. The generating unit generates and outputs first backup data including an information processing component and processing specifying information. The information processing component is included in the apparatus and includes identification information of a save area storing processing result data obtained through execution of a process defined by the information processing component. The processing specifying information uniquely identifies a process which is to be applied to the processing result data stored in the save area. The save area is included in the apparatus and is indicated by the identification information. When a person inputs an instruction to copy second backup data to the apparatus, if a first process matches a second process, the copy unit copies the information processing component in the second backup data to the apparatus. The second backup data is generated by the generating unit of a different apparatus. The first process is applied to processing result data stored in a first save area. The first save area is included in the apparatus and is indicated by the identification information included in the information processing component in the second backup data. The second process is identified by using the processing specifying information included in the second backup data. If the first process is different from the second process, the copy unit transmits a notification to the person.

BRIEF DESCRIPTION OF THE DRAWINGS

Exemplary embodiment of the present disclosure will be described in detail based on the following figures, wherein:

FIG. 1 is a diagram illustrating an exemplary system according to an exemplary embodiment;

FIG. 2 is a schematic diagram illustrating a user interface (UI) screen example of an apparatus;

FIG. 3 is a diagram illustrating exemplary data of box management information;

FIG. 4 is a diagram illustrating exemplary data of an instruction description;

DETAILED DESCRIPTION

Exemplary System Configuration

Figure 5:
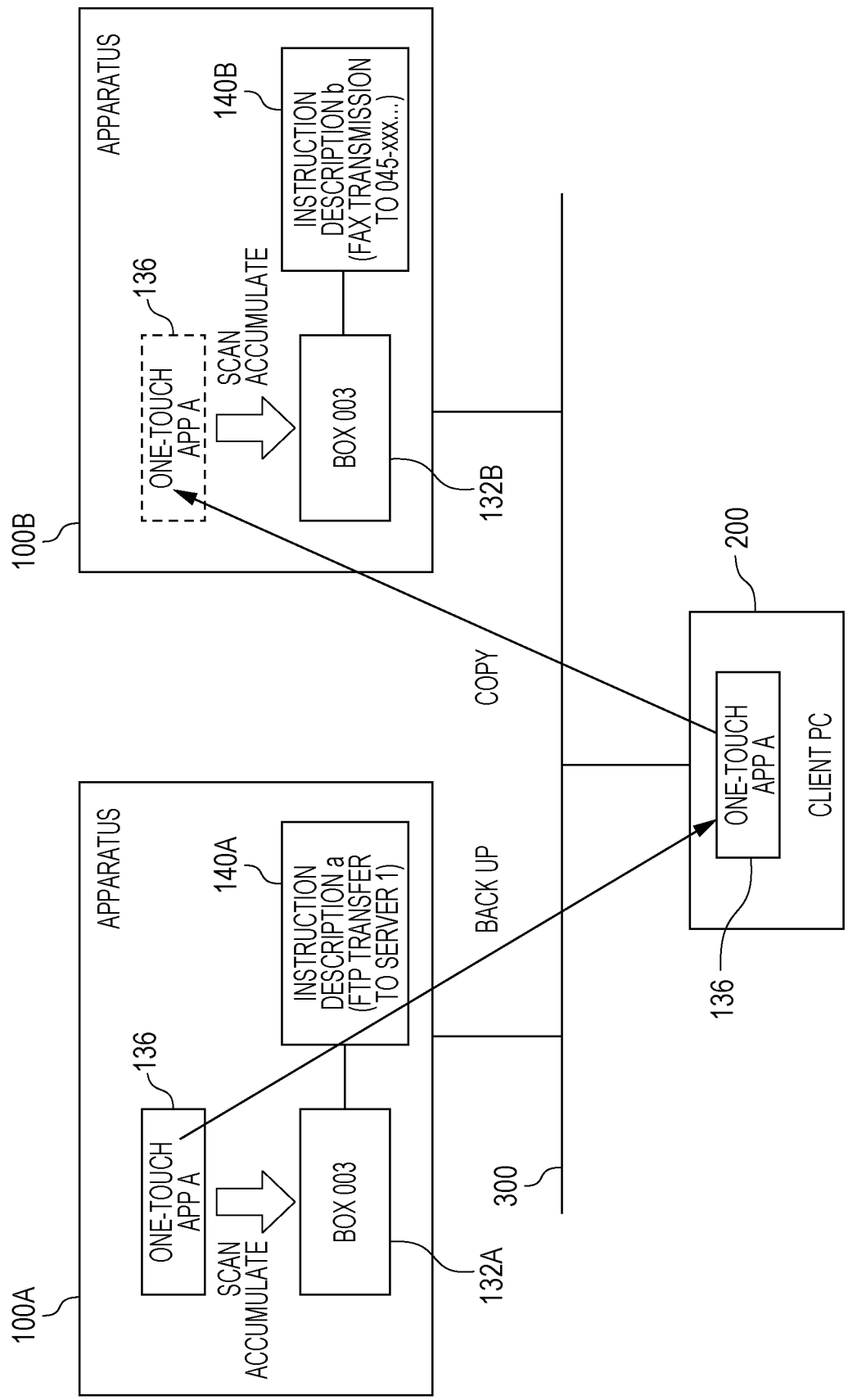
FIG. 5 is a diagram for describing the situation which may occur when a one-touch app installed in an apparatus is copied to a different apparatus.

FIG. 1 illustrates an exemplary system configuration according to the present exemplary embodiment. The system includes apparatuses 100 and a client personal computer (PC) 200 which are connected to a network 300 such as a local area network.

Each apparatus 100 includes an operation panel 110, a controller 120, and a storage device 130.

The operation panel 110 includes, for example, an input/output apparatus having a graphical user interface, such as a touch-panel display apparatus. The operation panel 110 displays a user interface (UI) screen to a user, and receives operation input on the UI screen from the user. In addition, the operation panel 110 may include input apparatuses other than a display apparatus, such as a start button for giving an instruction to start execution of a process and a numeric keypad for inputting a numeric.

The controller 120, which performs the information processing function provided by the apparatus 100, includes hardware for the information processing function, that is, for example, a processor such as a central processing unit (CPU) and a memory as a primary memory. The controller 120 includes programs, such as an operating system (OS), firmware, and various application programs, which are executed by using the hardware. A backup generating unit 122, an app copying unit 124, and a client UI unit 126 which are illustrated in the controller 120 are functions implemented by executing programs. These functions will be described below.

The storage device 130 is a secondary storage device, that is, a device which semi-permanently stores data (that is, which continues to store data as long as no explicit delete instructions are given). The storage device 130 is, for example, a disk device (for example, a hardware disk or a solid-state disk). The storage device 130 is managed, for example, by an OS file system of the controller 120. The storage device 130 stores data, such as box management information 134 and one-touch apps 136. The storage device 130 may include one or more boxes 132 which are exemplary save areas described below. The boxes 132 may be implemented, for example, as folders in a file system.

Schematically, each apparatus 100 has the information processing function for executing computer programs. The controller 120 is a unit performing the information processing function of the apparatus 100.

In addition, the apparatus 100 may have hardware for performing functions other than the information processing function, such as a print mechanism, a scan mechanism, a facsimile reception/transmission mechanism, and a network communication device. An image processing apparatus such as a multi-function device is an exemplary apparatus 100.

The apparatus 100 has one or more logical save areas for storing data such as files. There are some multi-function devices, as exemplary apparatuses 100, which have a configuration in which one or more save areas called confidential boxes, security boxes, or the like may be set. In the example in FIG. 1, such save areas are illustrated as the boxes 132. The boxes 132 may store various data, such as scan image data obtained through the scan function, data obtained by processing scan image data, facsimile data received through the facsimile function, and electronic mail received by using the mail reception function of the apparatus 100.

A save area in the apparatus 100 may be associated with, that is, may be set to, a user who is capable of accessing the save area. Herein, such a user is called an owner of the save area.

The save areas in the apparatus 100 may be associated individually with processes which are applied to the data stored in the save areas. The process associated with a save area is applied to, that is, is performed on, the data stored in the save area.

There are multiple types of process applied to data stored in a save area: a process defined as a function provided by the apparatus 100 and as setting information for the function (for example, various parameters); a process defined as a program executed by the information processing function.

An example of the former is a print process or a facsimile transmission process. In the print process, a print density, the print mode (that is, the mode for specifying monochrome print or full color print), and the like are specified as setting information. In the facsimile transmission process, a destination FAX number is specified as setting information. In this example, as information indicating a process applied to the data stored in a save area, information is registered in the apparatus 100 in association with the save area. The registered information includes identification information (for example, identification information indicating the print function) of the function, which is used for the process, of the apparatus 100, and setting information (for example, a set of the print density and the print mode) applied to the function.

In the latter case, that is, the case in which a process applied to the data stored in a save area is defined as a program, a user may create the program defining the process, and may associate (that is, may set) the created program, serving as the information defining the process, with the save area. Alternatively, a user may select one of the existing programs prepared in the apparatus 100, and may input data for user-customizable parts (for example, setting information such as parameters) in the program. In this way, the user may create information defining the process, and may associate the information with the save area. The information includes, for example, information for specifying the existing program selected by the user and data which is input by the user for individual customizable parts in the program.

The information, which thus defines the process applied to the data stored in a save area, may be configured as data called an instruction description or a job flow as in the example described below. The instruction description is data defining the process executable by using one or more functions provided by the apparatus 100. The functions provided by the apparatus 100 include a function implemented through information processing performed by the controller 120, a function implemented by using a hardware mechanism, such as a scanner or a printer, included in the apparatus 100, and a function implemented through a combination of the information processing of the controller 120 and a hardware mechanism such as a scanner. There are multiple types of process defined by using an instruction description: a process defined by using a function provided by the apparatus 100 and setting information for the function; a process defined as a program executed by the information processing function of the apparatus 100. Information such as an instruction description defining a process applied to the data stored in a save area is installed, for example, in the storage device 130 of the apparatus 100.

In the apparatus 100, an information processing component may be registered. The information processing component is data for defining a process executable by using one or more functions provided by the apparatus 100. There are multiple types of process defined by an information processing component: a process defined by using a function provided by the apparatus 100 and setting information (for example, various parameters) for the function; a process defined as a program executed by the information processing function of the apparatus 100. An example of the former is a specific scan process defined by using a set of the scan function and scan setting information (for example, a scan resolution). An example of the latter is a process in which the scan function is operated to obtain scan image data which is stored in a specific save area.

In an example of the former, an information processing component includes information indicating identification information of a function, which is used for the process, of the apparatus 100, and setting information for the function.

In an example of the latter, a user may create a program defining the process, and may register the created program as an information processing component in the apparatus 100. Alternatively, the user may select one of the existing programs prepared in the apparatus 100, and may input data for user-customizable parts (for example, setting information such as parameters) in the program. In this way, the user may create an information processing component which is registered in the apparatus 100. In this case, an information processing component includes, for example, information for specifying the existing program selected by the user, and data which is input by the user for individual customizable parts in the program.

An information processing component described as an example may be created, for example, as data called an instruction description or a job flow.

For example, when a user gives an explicit instruction to execute an information processing component, or when an execution condition, which is set in advance in the apparatus 100, for the information processing component is satisfied, the process defined by the information processing component is executed by the apparatus 100. When the information processing component includes a program defining the processing content, the program is executed by the information processing function of the apparatus 100. To receive an instruction to execute an information processing component from a user, an icon indicating the information processing component may be displayed in the UI screen displayed on the operation panel 110 or the like of the apparatus 100. In this case, when a user selects the icon of the information processing component on the UI screen and performs an operation of giving an execution instruction, the process defined by the information processing component is performed.

When the process defined by the information processing component outputs its processing result as electronic data (hereinafter referred to as processing result data), information defining the output destination of the processing result data is included in the information processing component. A save area such as a confidential box may be selected as the output destination of the processing result data. In this case, the information processing component includes identification information for uniquely identifying the save area (that is, a box 132 in the example in FIG. 1) serving as the output destination of the processing result data.

The identification information of the save area is not unique globally, and is unique among the save areas included in a single apparatus 100. Thus, if an information processing component, in which the save area corresponding to certain identification information (which is referred to as first identification information) in a first apparatus 100 is used as the output destination of the processing result, is simply copied to a second apparatus 100, a processing result of the information processing component in the second apparatus 100 is output to the save area, which corresponds to the same first identification information, in the second apparatus 100.

In the example in FIG. 1, the one-touch apps 136, which are exemplary information processing components, are installed in an apparatus 100. The one-touch apps 136 are stored in the storage device 130 in the apparatus 100. In the UI screen displayed on the operation panel 110, the icons for the one-touch apps 136 are displayed.

For example, in a UI screen 400 of the apparatus 100 illustrated in FIG. 2, icons 410 indicating buttons for calling the processing functions provided by the apparatus 100 are arranged in a matrix. When the processing functions are too many to be displayed in a single screen, other icons 410 are displayed in a different screen display area displayed through scrolling or paging-down. The icons 410 displayed in the UI screen 400 include icons corresponding to factory-installed native functions provided by the apparatus 100, such as a copy button 412 and a FAX transmission button 414. The icons 410 may include icons 416 for one-touch apps 136. A one-touch app 136 is software indicating, for example, a function implemented through various types of information processing performed by the controller 120, or a combinational function obtained by combining one or more native functions of the apparatus 100 with information processing. For example, the one-touch app 136 indicated by the "Transmission to YYY Corp." icon 416 illustrated in FIG. 2 is software indicating a function in which an image, which is read by using the scan function provided by the apparatus 100, is faxed to the FAX number of YYY Corp. by using the FAX reception/transmission function provided by the controller 120. A user may create data of a one-touch app 136, which defines the processing content desired by the user, for installation in the apparatus 100.

When a user presses an icon 416 on the UI screen 400 through a touch operation or the like, the one-touch app 136 corresponding to the icon 416 is executed by the controller 120.

The one-touch apps 136 installed in the apparatus 100 include an app in which any of the boxes 132 is assigned as the output destination of the processing result data obtained through execution of the one-touch app 136. Such a one-touch app 136 includes identification information of the box 132 assigned as the output destination.

The box management information 134 is information which is used to manage the boxes 132 and which is included in the storage device 130 of the apparatus 100. The boxes are exemplary save areas in the apparatus 100. FIG. 3 illustrates exemplary data of the box management information 134. The box management information illustrated in FIG. 3 includes fields for each box 132, such as the box number field, the owner field, and the instruction description field.

In the box number field, the box number which is exemplary identification information of the corresponding box 132 is registered. The box number is exemplary identification information of a save area. The identification information of a save area is not limited to information in the numeric format, for example, the box number. The identification information of a save area may be in any format as long as the identification information has information with which the save area may be identified uniquely among the save areas in the apparatus 100.

In the owner field, identification information (hereinafter also referred to as a user ID) of a user who has access rights to the corresponding box 132 is registered. Multiple owners may be registered for a box 132. When a box 132 is set so as to be permitted to be used by any one, the owner field of the box 132 indicates, for example, "anyone" or a blank field.

In the instruction description field, information for specifying the instruction description applied to the data stored in the corresponding box 132 (for example, identification information indicating the instruction-description data body stored in the storage device 130) is registered. The instruction description is data for defining a process performed by the apparatus 100.

The data stored in a box 132 is subjected to the process defined by the instruction description indicated in the instruction description field corresponding to the box 132 (hereinafter also referred to as "the instruction description corresponding to a box 132"). Whether the instruction description corresponding to a box 132 is automatically applied to the data stored in the box 132, or the instruction description is applied in response to an instruction from a user is settable. When the latter is set, only storage of data in a box 132 does not cause the instruction description corresponding to the box 132 to be applied to the data. In this case, a user selects the data in the box 132, and gives an instruction to perform the instruction description. Only after these operations, the instruction description is applied to the data. In the former case, that is, in the case where the setting for automatically applying the instruction description corresponding to a box 132 has been set for the box 132, storage of data in the box 132 causes the instruction description to be automatically applied to the data. Application of an instruction description to data indicates execution of the process, which is defined by the instruction description, on the data.

FIG. 4 illustrates exemplary data included in an instruction description. The illustrated instruction description includes items, such as "Name", "Update date and time", "Owner", "Description", "Hash value", "Processing content", "FAX", "Mail", "FTP", and "Print". "Name" indicates the name of the instruction description, and is given, for example, by a creator of the instruction description (that is, the owner of the instruction description). "Update date and time" indicates the latest update date and time of the instruction description. In the item "Owner", the user ID of the owner of the instruction description is registered. In the item "Description", a description for users about the processing content and the like of the instruction description is registered. In the item "Hash value", the hash value of the data included in the item "Processing content", which is described below, is registered.

In the item "Processing content", data indicating the content of the process defined by the instruction description, such as a program describing the processing content or a set of a function specifying the processing content and setting information, is registered. "Hash value" described above indicates a hash value of the data of "Processing content". In the case where "Processing content" is described by using a program, for example, the program may be described by using a script language, or may be executable binary codes.

In the item "FAX", the FAX number of a transmission destination is registered when "Processing content" defined by the instruction description involves FAX (that is, facsimile) transmission. In the item "Mail", the electronic mail address of a transmission destination, to which an output image (such as a printed image or an image transmitted through FAX) obtained through the processing of "Processing content" defined by the instruction description is transmitted, is registered. This example assumes that an image transmitted through FAX is transmitted to a manager who manages the task (for example, for an audit performed later). In the item "Mail", the mail address of the manager is registered. In the item "FTP", the URL indicating a transfer destination is registered when "Processing content" defined by the instruction description involves a process of, for example, transferring the processing result data to a remote server or the like through file transfer protocol (FTP). In the item "Print", print setting information or the like of an image is registered when "Processing content" defined by the instruction description involves printing the image obtained through the processing.

The Situation Occurring when a One-Touch App is Copied to a Different Apparatus

Referring to FIG. 5, a situation will be described which may occur when a one-touch app 136, which is installed in an apparatus 100, is copied to a different apparatus 100.

The example in FIG. 5 illustrates the case in which a user copies a one-touch app 136 (hereinafter called a "one-touch app A"), which is installed in an apparatus 100A, to an apparatus 100B. In this example, the one-touch app A is an application indicating a process of outputting a scan image, which is obtained through scanning using a scanner included in the apparatus 100A, to a box 132A in the apparatus 100A. The box 132A is identified with the identification information "003". Therefore, accurately, the one-touch app A indicates a process of storing a scan image, which is obtained through scanning using the scanner included in the apparatus 100A, in a box identified with the identification information "003". The box 132A is associated with an instruction description 140A defining the process applied to data stored in the box 132A. The instruction description 140A indicates a process of transferring data, which is stored in the corresponding box 132A, to a specific server (in FIG. 5, named "server 1") through FTP.

Assume the case in which a user copies the one-touch app A in the apparatus 100A to the apparatus 100B which is different from the apparatus 100A and which is located on the same network 300 as the apparatus 100A. In this case, the user accesses the apparatus 100A from the client PC 200 on the network 300, and instructs the apparatus 100A to back up the one-touch app A. In response to this, the apparatus 100A generates backup data of the one-touch app A, and transfers the backup data to the client PC 200. The transferred backup data is stored in the file system in the client PC 200. The backup data includes the one-touch app A.

After that, the user accesses the apparatus 100B, which is the copy destination, from the client PC 200, and instructs the apparatus 100B to copy the one-touch app A in the backup data stored earlier.

The processing content defined by the one-touch app A having been copied to the apparatus 100B in response to the instruction is the same as that of the one-touch app A in the apparatus 100A. Therefore, when the one-touch app A having been copied to the apparatus 100B is executed, a scan image, which is obtained through scanning using the scanner included in the apparatus 100B, is stored in a box 132B, which is identified with the identification information "003", in the apparatus 100B.

An instruction description 140B, which is set to the box 132B in the apparatus 100B, is independent from the instruction description 140A, which is set to the box 132A that has the same identification information "003" and that is included in the apparatus 100A. Typically, the processing content defined by the instruction description 140B is different from that defined by the instruction description 140A. In the illustrated example, the processing content of the instruction description 140B indicates that FAX transmission is performed on data (that is, a scan image), which is stored in the box 132B, to the FAX number "045-xxx . . . ". Therefore, when the one-touch app A having been copied to the apparatus 100B is executed, an image obtained through scanning in the apparatus 100B is transmitted through faxing to the FAX number. This process is different from the process performed when the same one-touch app A in the copy-source apparatus 100A is executed. The following situation may occur: a user copies the one-touch app A with their expectation that, in the apparatus 100B, a scan result is transferred to the "server 1" similarly to the case of the apparatus 100A; the result is that a scan result is transmitted to a destination which is not expected by the user.

Mechanism for Addressing the Situation

In the present exemplary embodiment, the backup generating unit 122, the app copying unit 124, and the client UI unit 126 in the controller 120 perform the process for addressing the situation.

The backup generating unit 122 generates backup data of a one-touch app 136 in the storage device 130 in response to an instruction from a user. The backup data generated by the backup generating unit 122 includes, in addition to data about a one-touch app 136 itself, a hash value (see FIG. 4) for specifying the processing content of the instruction description 140A associated with the output-destination box 132 for the processing result of the one-touch app 136. As described by referring to FIG. 4, the hash value is a hash value of data indicating the processing content of the instruction description 140A, and may uniquely identify the processing content. The data about the one-touch app 136 itself which is included in the backup data includes identification information of the output-destination box 132 for the processing result of the one-touch app 136.

When the output destination of the processing result of a one-touch app 136 that is to be backed up is other than a box, the backup data does not include a hash value for specifying the processing content of the instruction description. This is because the output destination other than a box is not associated with an instruction description.

In this example, a one-touch app 136 is an exemplary information processing component, and a box 132 is an exemplary save area. A hash value is exemplary processing specifying information. The backup generating unit 122 is an exemplary generating unit.

The app copying unit 124 receives backup data which is input from a user, and copies the one-touch app 136, which is included in the backup data, to the storage device 130 of the apparatus thereof. The input backup data is generated by the backup generating unit 122 of a different apparatus 100 (hereinafter referred to as a "copy-source apparatus"). The app copying unit 124 uses the hash value, which is included in the backup data, to determine whether or not the processing result of the one-touch app 136 is processed in the apparatus similarly to the case of the copy-source apparatus. That is, the app copying unit 124 determines whether or not the hash value in the backup data matches that of the processing content of the instruction description which is set to the box 132 that is included in the apparatus 100 and that is an output destination of the processing result of the one-touch app 136. If the hash values match each other, the instruction description, which is set to the output-destination box 132 for the processing result obtained through execution of the one-touch app 136 in the apparatus, is the same as that of the processing content of the copy-source apparatus. In this case, the processing result of the copied one-touch app 136 is processed by using the instruction description of the processing content which is the same as that in the case of the copy-source apparatus. Thus, if the one-touch app 136 is copied to the apparatus, the situation, which is not expected by a user, does not occur. The app copying unit 124 is an exemplary copy unit.

In contrast, if the hash values do not match each other, the processing content of the instruction description, which is set to the output-destination box 132 for the processing result of the one-touch app 136, is different from that in the case of the copy-source apparatus. In this case, if the copied one-touch app is executed, the instruction description of the processing content different from that in the case of the copy-source apparatus is applied, in the output-destination box 132, to the processing result obtained through the execution. Such a situation may not be expected by the user. Thus, in this case, the app copying unit 124 does not copy the one-touch app 136 in the backup data right away, and displays an alarm message to a user through the client UI unit 126 to request that the problem be addressed.

The client UI unit 126 provides a UI screen for operations of the apparatus 100, over the network 300 to the client PC 200. The client UI unit 126 particularly provides a UI screen for the process of backing up a one-touch app 136 or for the process of copying backup data generated by the copy-source apparatus. A UI screen is provided, for example, by using a web technique.

Figure 6:
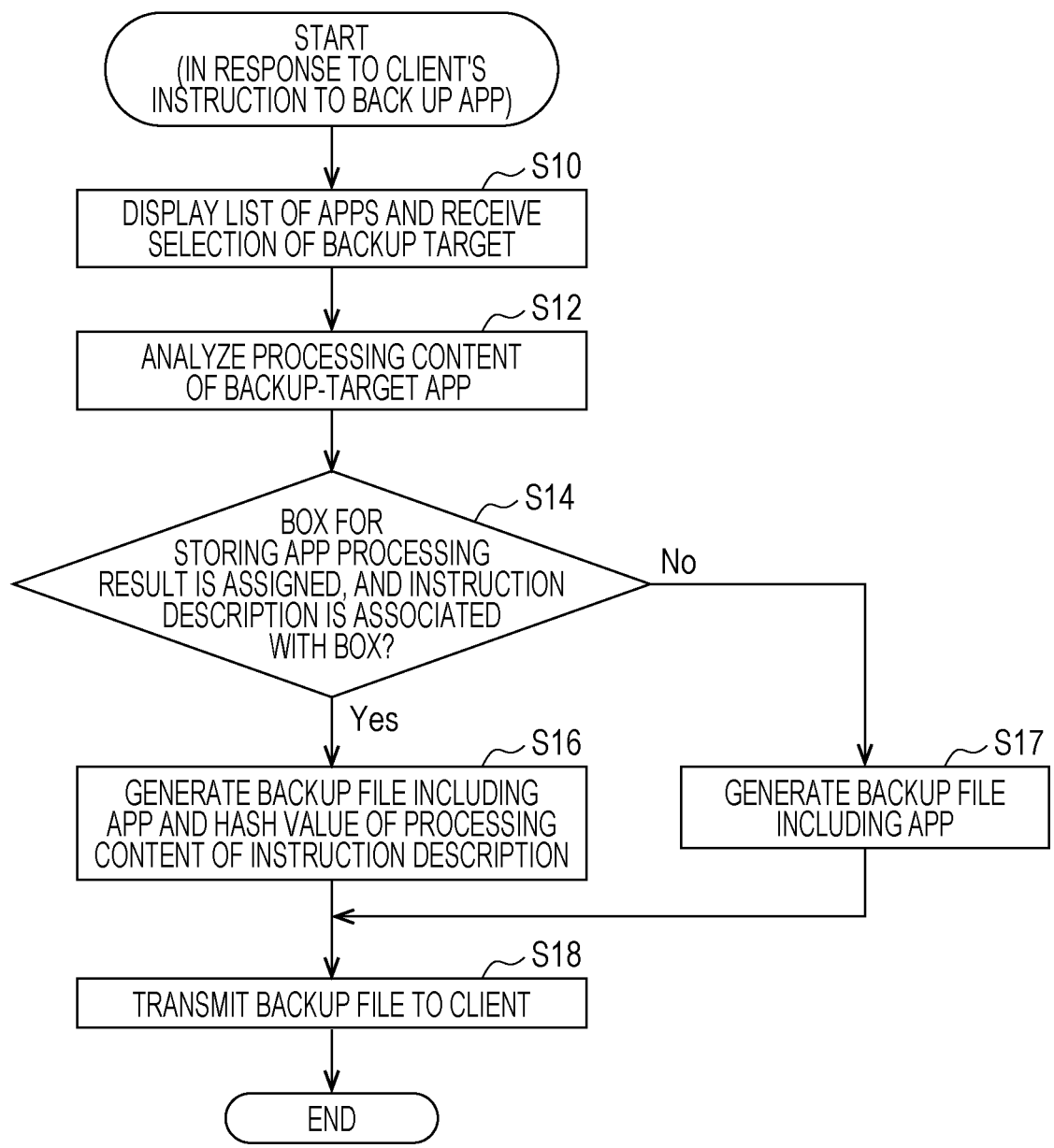
FIG. 6 is a diagram illustrating an exemplary procedure of a backup generating unit in an apparatus according to an exemplary embodiment.

FIG. 6 illustrates a procedure performed by the backup generating unit 122.

When a user accesses the client UI unit 126 of an apparatus 100 from the client PC 200, the client UI unit 126 provides a menu screen to the client PC 200. The menu screen includes "Back up a one-touch app" as one menu item. When the user gives an instruction to execute the menu item, the procedure illustrated in FIG. 6 is performed.

In the procedure, the client UI unit 126 provides a selection screen, in which a list of the one-touch apps 136 installed in the storage device 130 of the apparatus 100 is displayed, to the client PC 200. Then, the client UI unit 126 receives, from the user, selection of a one-touch app 136 that is to be backed up (S10).

When the user selects a one-touch app 136, which is to be backed up, on the selection screen, the client PC 200 transmits the selection result to the client UI unit 126. The backup generating unit 122 receives the selection result from the client UI unit 126, and analyzes the data about the processing content of the one-touch app 136 indicated by the selection result (S12). In this analysis, it is checked whether or not an output-destination box 132 for the processing result data has been assigned in the one-touch app 136. That is, it is checked whether or not data about the processing content of the one-touch app 136 includes the identification information of the output-destination box 132 for the processing result data of the one-touch app 136. When an output-destination box 132 for the processing result data is assigned in the one-touch app 136, the backup generating unit 122 further checks if there is an instruction description associated with the box 132.

On the basis of the analysis result, the backup generating unit 122 determines whether or not the condition, "A box 132 is assigned as the output destination of the processing result of the one-touch app 136 that is to be backed up, and an instruction description is associated with the box 132", is satisfied (S14).

If the determination result in S14 is Yes, the backup generating unit 122 generates a file of backup data including the one-touch app 136 and the hash value of the processing content of the instruction description (S16). The one-touch app 136 included in the file includes identification information of the output-destination box 132 for the processing result data.

If the determination result in S14 is No, the backup generating unit 122 generates a file of backup data including the one-touch app 136 (S17). In this case, since there are no instruction descriptions applied to the processing result data of the one-touch app 136, unlike S16, the backup data generated in S17 does not include the hash value of the processing content of an instruction description.

After S16 or S17, the backup generating unit 122 transmits the file of the generated backup data to the client PC 200 (S18). The client PC 200 receives and stores the file.

Figure 7:
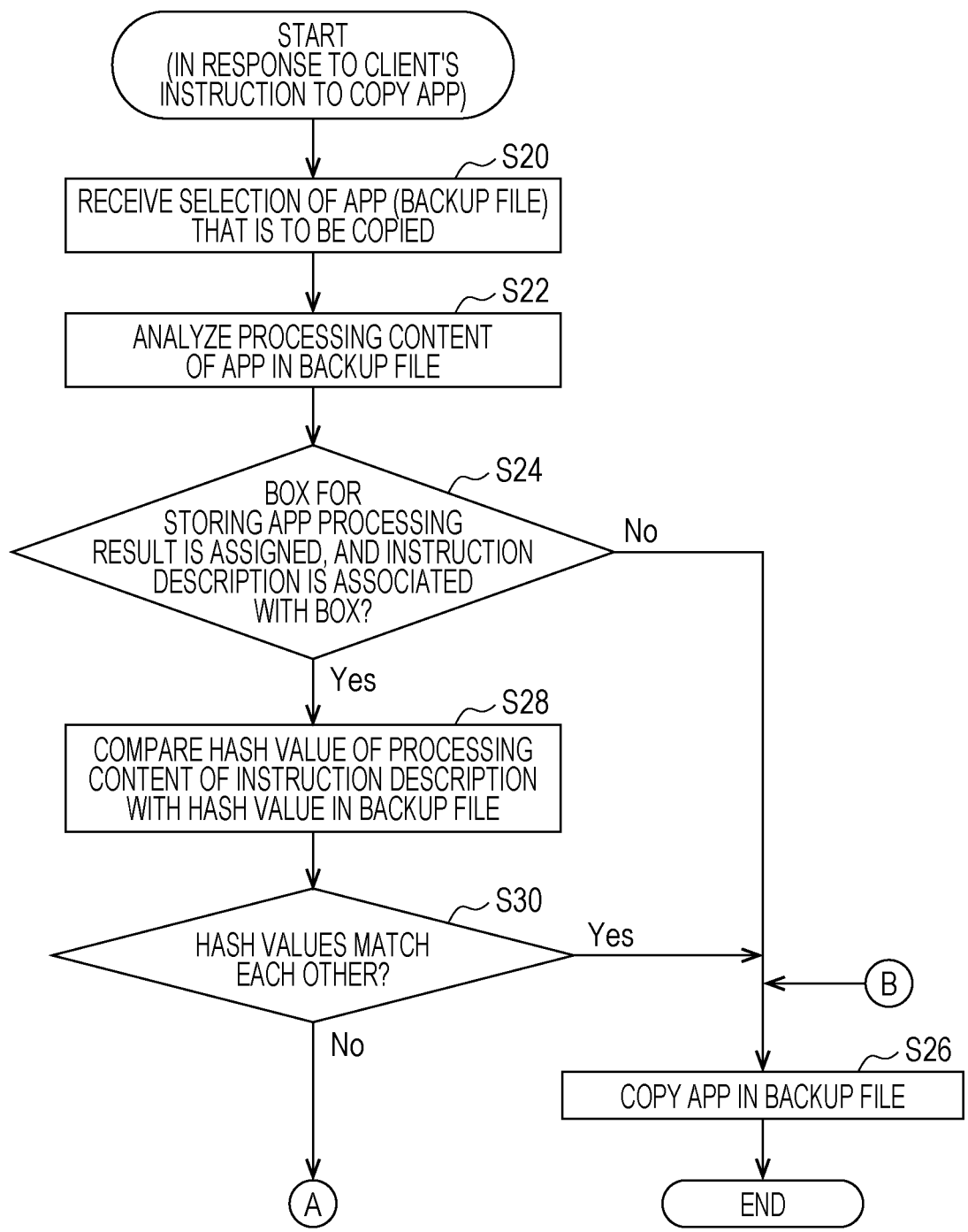
FIG. 7 is a diagram illustrating the first half of an exemplary procedure of an app copying unit in an apparatus according to an exemplary embodiment.
Figure 8:
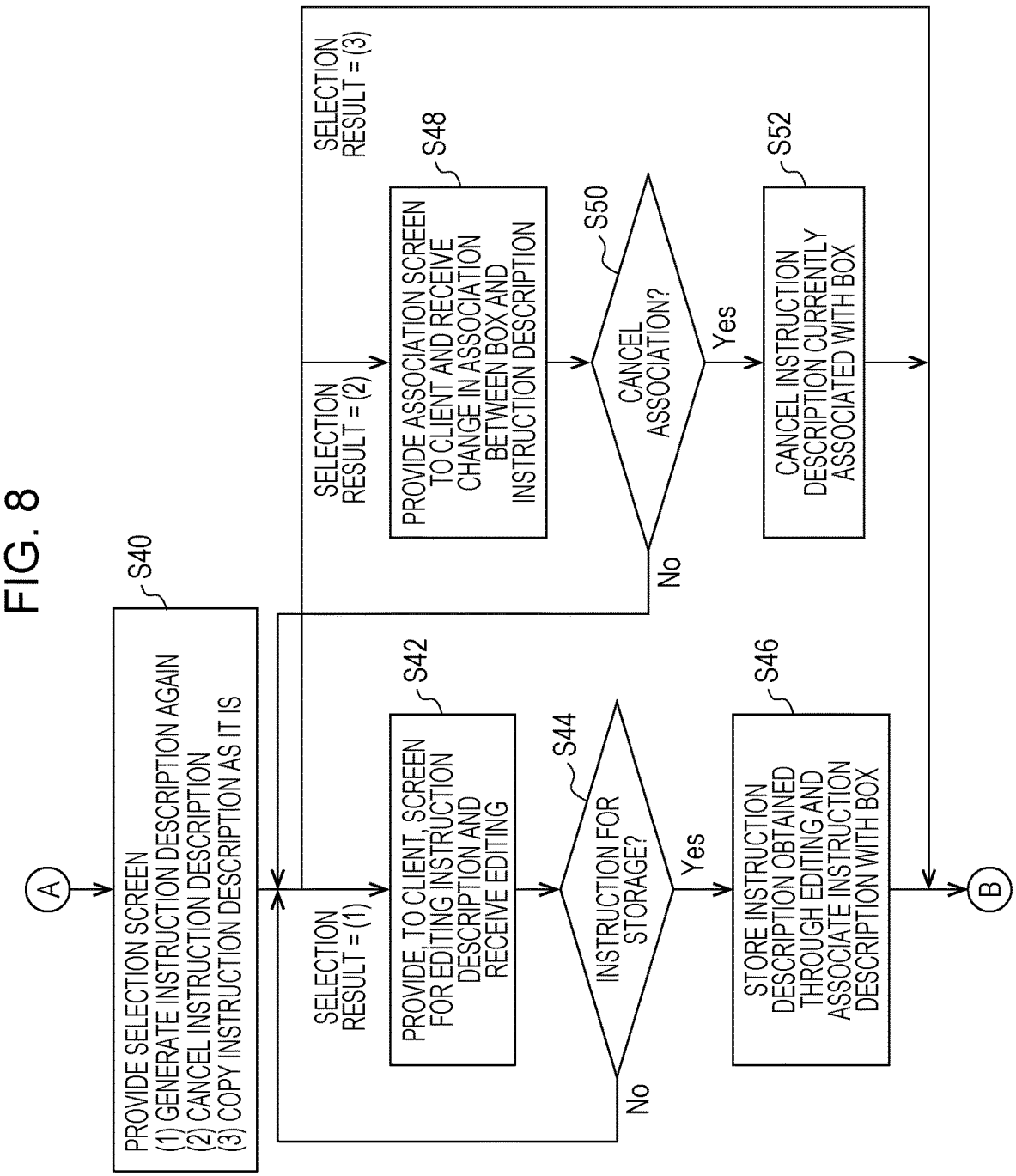
FIG. 8 is a diagram illustrating the second half of an exemplary procedure of an app copying unit in an apparatus according to an exemplary embodiment.

Referring to FIGS. 7 and 8, an exemplary procedure performed by the app copying unit 124 will be described.

According to the procedure in FIG. 6, a user obtains, in their client PC 200, a backup data file of a one-touch app 136 in a certain apparatus 100. Then, the user accesses the client UI unit 126 of a different apparatus 100 which serves as a copy destination. The client UI unit 126 provides a menu screen to the client PC 200. The menu screen includes "Copy a backed-up one-touch app" as a menu item. When the user gives an instruction to execute the menu item, the procedure illustrated in FIGS. 7 and 8 is performed.

In this case, as illustrated in FIG. 7, the client UI unit 126 provides, to the client PC 200, a screen for receiving selection of backup data that is to be copied (S20). The user inputs one file, which is selected from the backup data files stored in the client PC 200, in the input field on the screen displayed on the client PC 200. The client PC 200 transmits the selected backup data file to the client UI unit 126.

The app copying unit 124 of the apparatus 100 receives the backup data file from the client UI unit 126, and analyzes the processing content of the one-touch app 136 included in the file (S22). In this analysis, it is first checked whether or not an output-destination box 132 for the processing result data has been assigned in the one-touch app 136. That is, it is checked whether or not data about the processing content of the one-touch app 136 includes the identification information of the output-destination box 132 for the processing result data of the one-touch app 136. If an output-destination box 132 for the processing result data is assigned to the one-touch app 136, the app copying unit 124 further checks if there is an instruction description which is associated with the box 132 having the identification information and which is included in the apparatus 100.

On the basis of the analysis result, the app copying unit 124 determines whether or not the condition, "A box 132 is assigned as the output destination of the processing result of the one-touch app 136, and an instruction description is associated with the box 132", is satisfied (S24).

If the determination result in S24 is No, the output destination of the processing result of the one-touch app 136 is other than a box, or, even if the output destination is a box, the box is not associated with an instruction description. In the former case, the processing result of the one-touch app 136 is not subjected to the process, which is performed according to an instruction description, in the output destination. Thus, the situation described above does not occur. In the latter case, the processing result of the one-touch app 136 is stored in a box 132, which is not associated with an instruction description, in the apparatus 100. Therefore, the processing result is simply stored in the box 132, and is not subjected to an instruction description having processing content which is not expected by a user. Thus, if the determination result in S24 is No, the app copying unit 124 copies the one-touch app 136 in the backup data, to the storage device 130 in the apparatus 100 (S26), and ends the process.

In contrast, if the determination result in S24 is Yes, the instruction description associated with the box 132, which is included in the apparatus and which is assigned as the output destination of the processing result of the one-touch app 136 in the backup data, is compared with the hash value included in the backup data (S28). It is determined whether or not the two hash values match each other (S30). In this step, if an instruction description is not associated with the output-destination box for the one-touch app in the copy-source apparatus, no hash value is not included in the backup data. In this case, the comparison result in S28 indicates that the hash values do not match each other, and the determination result in S30 is No.

If the determination result in S30 is Yes, the processing content of the instruction description associated with the box 132 is the same as that of the instruction description applied to the output-destination box 132 for the processing result of the one-touch app 136 in the copy-source apparatus 100. Therefore, the behavior of the apparatus 100 exhibited when the one-touch app 136, which has been copied to the apparatus 100, is executed is the same as that in the copy-source apparatus 100. This is what is expected by a user. Therefore, in this case, the app copying unit 124 copies the one-touch app 136 in the backup data to the storage device 130 in the apparatus 100 (S26), and ends the process.

If the determination result in S30 is No and if the one-touch app 136 in the backup data is copied as it is, the processing result is output to any box 132 in the apparatus 100, and is subjected to the process according to the instruction description associated with the box 132. If the processing content of the instruction description is different from that in the copy-source apparatus 100, or if no instruction description is associated with the output-destination box in the copy-source apparatus, the processing result of the copied one-touch app 136 is subjected to the process which is not expected by a user. Such a situation is to be avoided.

Accordingly, if the determination result in S30 is No, as illustrated in FIG. 8, the app copying unit 124 provides a selection screen for receiving a user instruction, through the client UI unit 126 to the client PC 200 (S40). The selection screen (not illustrated) displays a warning message, such as "The processing content of the instruction description, which is to be executed in the copy destination, is different from that in the copy source," as well as, for example, the following three options.

(1) Generate again an instruction description associated with the output-destination box.

(2) Cancel the instruction description associated with the output-destination box.

(3) Copy the instruction description as it is.

The name of the instruction description associated with the output-destination box 132 of the copy-source apparatus 100 and that associated with the output-destination box of the apparatus may be further displayed in the selection screen. The display of the names of these instruction descriptions is helpful in a user's selection of an option.

When a user selects option (1) on the selection screen, the client UI unit 126 provides, to the client PC 200, a screen for editing an instruction description, so as to cause the user to edit an instruction description (S42). Then, the client UI unit 126 waits for input of an instruction to store the edit result (S44). When the user completes editing and gives an instruction to store the instruction description which is an edit result, the client UI unit 126 stores the instruction description, which is an edit result, in the storage device 130, and associates the instruction description with the output-destination box 132 (S46). At that time, the instruction description, which has been associated with the box 132, is canceled. Thus, the process according to the instruction description is performed on the data stored in the box 132. The app copying unit 124 copies the one-touch app 136 in the backup data to the storage device 130 (S26), and ends the process. In this case, the instruction description edited by the user themselves is associated with the box 132, inhibiting occurrence of a situation which is not expected by the user.

When a user selects option (2) on the selection screen provided in S40, the client UI unit 126 provides, to the client PC 200, an association screen for receiving setting of association between an instruction description and the output-destination box 132 (S48). This screen displays identification information of the instruction description currently associated with the box 132. The user deletes identification information of the associated instruction description on the screen. Thus, the user cancels the association between the instruction description and the box 132. The client UI unit 126 waits for the user to cancel the association between the instruction description and the box 132 (S50). When the canceling operation is performed, the client UI unit 126 cancels the association between the instruction description and the box 132 (S52). The app copying unit 124 copies the one-touch app 136 in the backup data to the storage device 130 (S26), and ends the process. In this case, the box 132 is not associated with an instruction description. Thus, the processing result of the copied one-touch app 136 is simply stored in the box 132, and is not subjected in the box 132 to a process which is not expected by a user.

When the user selects option (3) on the selection screen provided in S40, the user knows that the instruction description which is to be executed is different from that in the copy-source apparatus, and selects copying of the one-touch app 136. Therefore, in this case, the app copying unit 124 simply copies the one-touch app 136 in the backup data to the storage device 130 (S26), and ends the process.

The processes performed when an apparatus 100 according to the exemplary embodiment backs up and copies a one-touch app 136 are described above.

In the example described above, if an instruction description is associated with the output-destination box 132 for the processing result of a one-touch app 136, the determination results in S14 and S24 are Yes. As another example of this, when an instruction description is associated with the output-destination box 132 for the processing result of a one-touch app 136 in the "automatic execution" mode, the determination results in S14 and S24 may be Yes. That is, in this example, there are the "automatic execution" mode and the "non-automatic execution" mode as the mode for association between an instruction description and a box 132. The instruction description associated with a box 132 in the "automatic execution" mode is performed automatically when data is stored in the box 132. In contrast, the instruction description associated with a box 132 in the "non-automatic execution" mode is not performed when data is simply stored in the box 132, and is performed only after reception of a user's explicit execution instruction. When a user is to associate an instruction description with a box, the user who has given an instruction to make the association selects one of the modes. The selected mode is stored in the storage device 130 in association with information about association between the box and the instruction description. For example, assume the case in which an instruction description is associated in the "non-automatic execution" mode with the output-destination box 132 of a one-touch app 136 that is to be copied to a copy-destination apparatus 100. In this case, the processing result of the one-touch app 136 is stored in the box 132. To perform the instruction description on the processing result, the user needs to give an explicit instruction to perform the instruction description. Therefore, when the user is to give the instruction, the user checks the name or the like of the instruction description, which is to be performed on the processing result, on the screen, and determines whether or not execution is to be performed on the basis of the check result. Thus, a process which is not expected by the user is not performed. Therefore, even if, when an instruction description is associated in the "non-automatic execution" mode with the output-destination box 132 for the processing result of a one-touch app 136, the determination result in S24 is No and the one-touch app 136 is copied, problems are difficult to occur. The same is true for the determination in S14. The matters described in this paragraph are similar to those in the modified examples described below.

FIRST MODIFIED EXAMPLE

Figure 9:
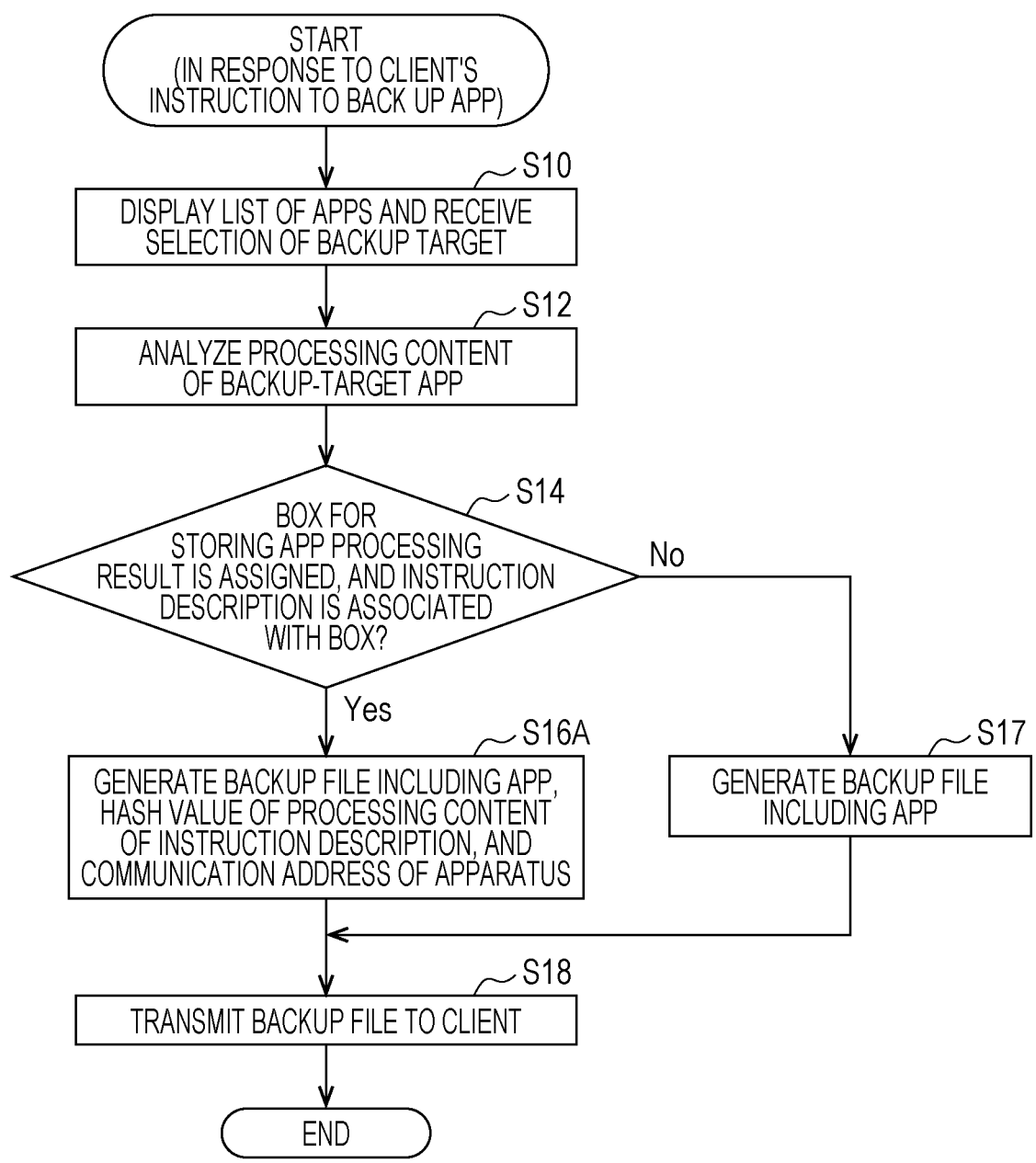
FIG. 9 is a diagram illustrating an exemplary procedure of a backup generating unit in an apparatus according to a first modified example.
Figure 10:
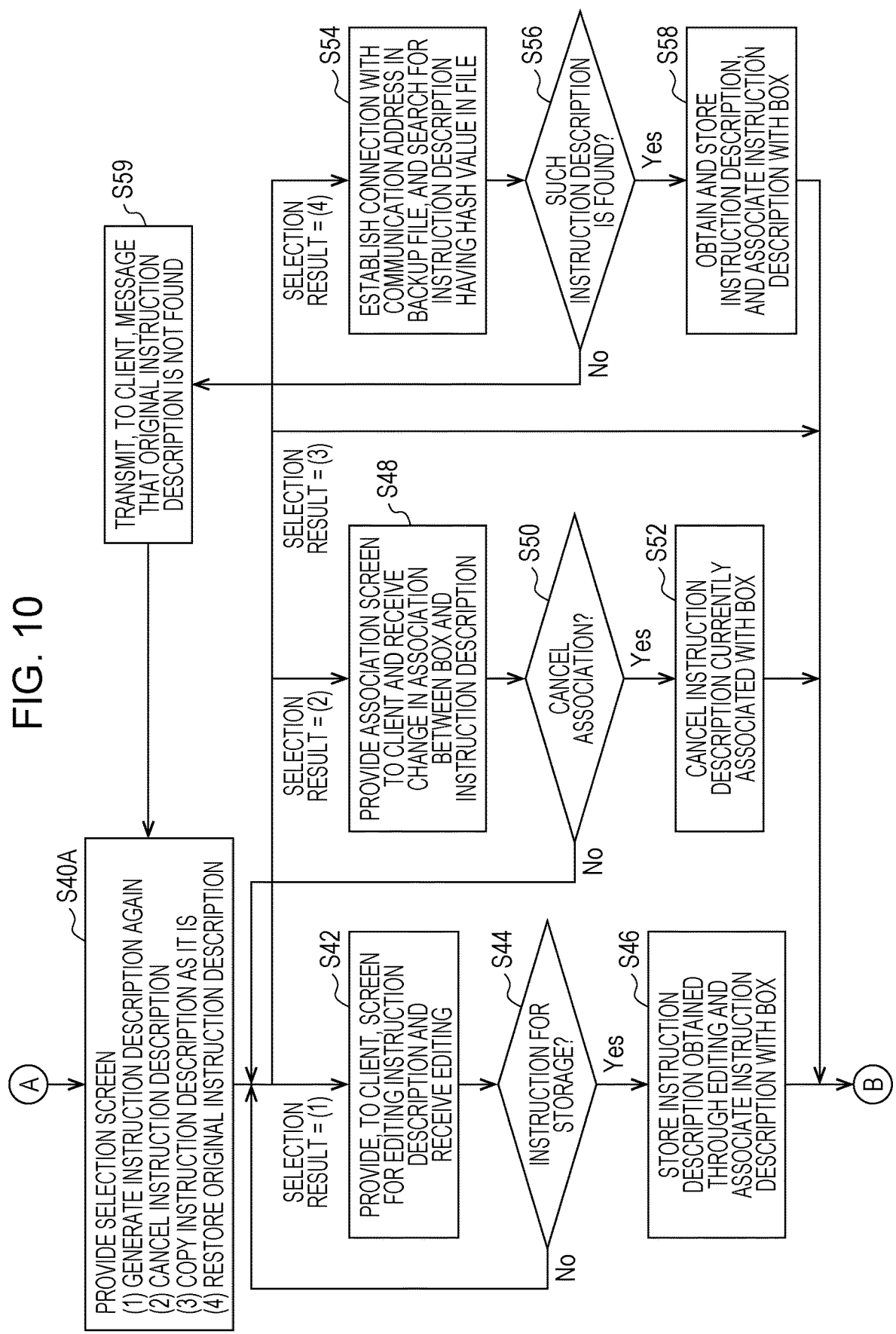
FIG. 10 is a diagram illustrating the second half of an exemplary procedure of an app copying unit in an apparatus according to the first modified example.

Referring to FIGS. 9 and 10, a first modified example will be described.

The first modified example provides a mechanism for associating an instruction description, whose processing content is the same as that of the instruction description associated with the output-destination box 132 for the processing result of the one-touch app 136 in a copy-source apparatus 100, with the output-destination box 132 in a copy-destination apparatus 100.

FIG. 9 illustrates an exemplary procedure of the backup generating unit 122 according to the first modified example. The procedure in FIG. 9 is the same as that in FIG. 6 except that the process in S16A is different from the process in S16 in the procedure in FIG. 6.

The backup data generated by the backup generating unit 122 in S16A further includes, in addition to information included in the backup data generated by the backup generating unit 122 in S16 in FIG. 6, the communication address (for example, the IP address) of the apparatus 100 of the backup generating unit 122.

The procedure performed by the app copying unit 124 according to the first modified example will be described. The first half, which is illustrated in FIG. 7, is the same between the exemplary embodiment and the first modified example. The second half, which is illustrated in FIG. 10, includes parts different from those of the procedure (see FIG. 8) according to the exemplary embodiment.

In the first modified example, a selection screen, which the app copying unit 124 provides to the client PC 200 in S40A, includes option (4), which is described below, in addition to options (1) to (3) included in the selection screen provided in S40 in the procedure (see FIG. 8) according to the exemplary embodiment.

(4) Restore the original instruction description.

The processes of the app copying unit 124 performed when a user selects any of options (1) to (3) are the same as those in FIG. 8.

When a user selects option (4), the app copying unit 124 establishes a connection with the copy-source apparatus 100 by using the communication address included in the backup data. The app copying unit 124 requests the copy-source apparatus 100 to search for an instruction description having the same hash value as that in the backup data (S54). If the copy-source apparatus 100 finds an instruction description having the hash value in the storage device 130, the copy-source apparatus 100 responds to the app copying unit 124 with the instruction description. If the copy-source apparatus 100 does not find such an instruction description, the copy-source apparatus 100 responds with a massage that there is not such an instruction description. The instruction description is exemplary "processing content information defining process content of a second process". If the app copying unit 124 receives an instruction description from the copy-source apparatus 100 as a response to the search request (the determination result in S56 is Yes), the app copying unit 124 stores the instruction description in the storage device 130 in the apparatus of the app copying unit 124. The app copying unit 124 associates the stored instruction description with the output-destination box 132 for the one-touch app 136 in the backup data (S58). The app copying unit 124 copies the one-touch app 136 in the backup data to the storage device 130 (S26), and ends the process.

If a requested instruction description fails to be obtained from the copy-source apparatus 100 in S54, or if a communication with the copy-source apparatus 100 fails to be established, the determination result in S56 is No. In this case, the app copying unit 124 provides, to the client PC 200, a screen including a message indicating that the requested original instruction description fails to be obtained, and goes back to S40A and presents the selection screen again to the client PC 200 to request the user's selection from the processes.

In the procedure illustrated in FIGS. 9 and 10, the backup generating unit 122 generates backup data including the communication address of the apparatus 100 (S16A). However, this is merely an example. As another example, in S16A, instead of the communication address, the backup generating unit 122 includes the instruction description itself associated with the output-destination box 132 for the processing result of the one-touch app 136 that is to be backed up, or data about the processing content of the instruction description, in the backup data. The instruction description or the data about the processing content of the instruction description is exemplary "processing content information defining processing content of the process applied to the processing result data stored in the save area, the save area being indicated by the identification information and being included in the apparatus".

SECOND MODIFIED EXAMPLE

Owners may be set to the boxes 132 in an apparatus 100. The owner of a box 132 is a user who is allowed to use the box 132. Information about the owner of a box 132 is stored as one item of attribute information of the box 132 in the storage device 130.

In the exemplary embodiment and the first modified example, identification information of the output-destination box 132 for the processing result of a one-touch app 136 is the same between the copy-source apparatus and the copy-destination apparatus. However, when an owner is set to a box 132, the owner of the box 132 having the identification information may be different between the copy-source apparatus and the copy-destination apparatus. This is not desirable in terms of security.

The second modified example employs a rule that the output-destination box 132 for the processing result of a one-touch app 136 in the copy-destination apparatus is selected from boxes whose owner is the same as that of the output-destination box 132 for the processing result of the one-touch app 136 in the copy-source apparatus.

Figure 11:
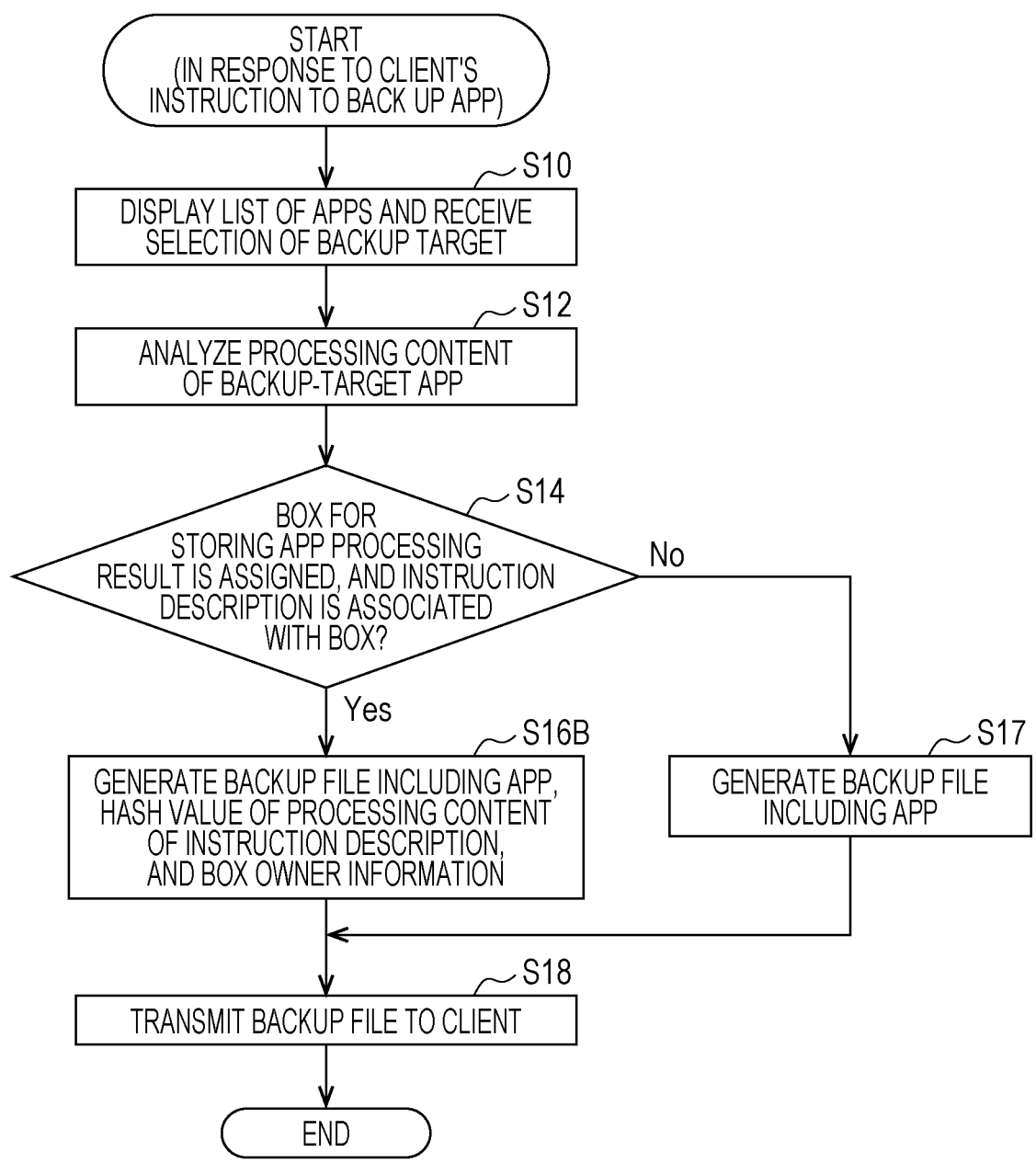
FIG. 11 is a diagram illustrating an exemplary procedure of a backup generating unit in an apparatus according to a second modified example.

FIG. 11 illustrates a procedure of the backup generating unit 122 according to the second modified example. The procedure in FIG. 11 is the same as that in FIG. 6 except that the process in S16B is different from the process in S16 in the procedure in FIG. 6.

The backup data generated by the backup generating unit 122 in S16B includes information about the owner of the output-destination box of a one-touch app 136 that is to be backed up, in addition to information included in the backup data generated by the backup generating unit 122 in S16 in FIG. 6. Information about an owner is, for example, user identification information of the owner.

Figure 12:
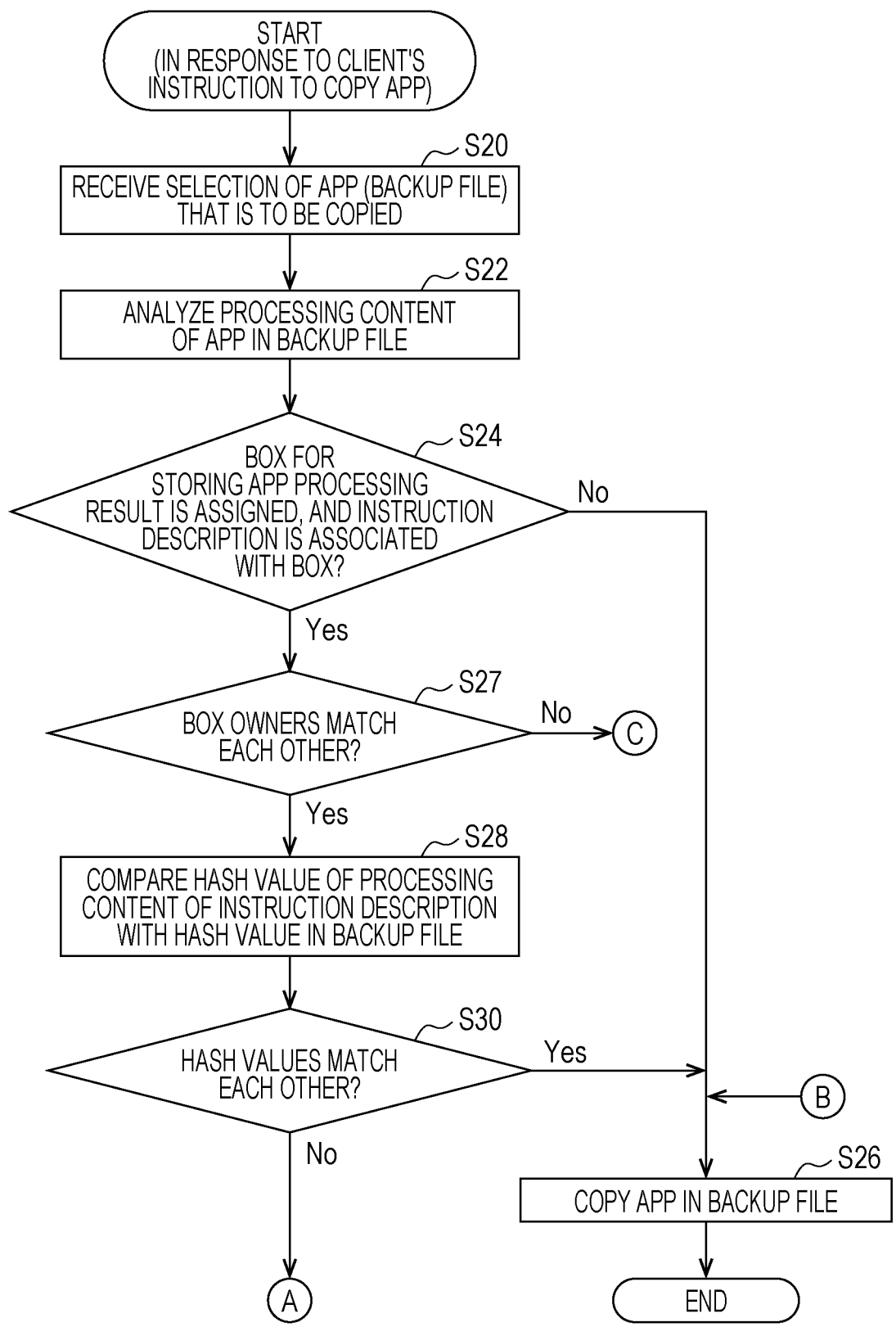
FIG. 12 is a diagram illustrating the first half of an exemplary procedure of an app copying unit in an apparatus according to the second modified example.

FIG. 12 illustrates the first half of the procedure of the app copying unit 124 according to the second modified example. The procedure in FIG. 12 is a procedure in which S27 is inserted to the procedure according to the exemplary embodiment in FIG. 7. That is, in the procedure in FIG. 12, if the determination result in S24 is Yes, the app copying unit 124 determines whether or not the owner of the output-destination box, which is specified in S24, for the processing result of the one-touch app 136, which is to be copied, in the apparatus (that is, the copy-destination apparatus) 100 matches the owner indicated by the owner information included in the backup data. If the determination result is Yes, the app copying unit 124 performs processes in S28 and its subsequent steps similarly to the procedure in FIG. 7.

If the determination result in S27 is No, the app copying unit 124 may display, on the client PC 200, a notification message indicating that the owner of the box 132 assigned as the output destination of the processing result of the one-touch app 136 that is to be copied is different from that in the copy-source apparatus 100. If the determination result in S27 is No, the process proceeds to the subroutine in FIG. 13. In the subroutine, the app copying unit 124 searches the boxes 132 in the apparatus 100 for a box 132 to which a user indicated by the owner information in the backup data is set as the owner (S60), and determines whether or not such a box 132 has been found (S62). If the determination result in S62 is No, the app copying unit 124 transmits an error message to the client PC 200 through the client UI unit 126, and stops copying the one-touch app 136 (S74). The error message indicates that, for example, "No boxes whose owner is the same as that of the output-destination box in the copy-source apparatus are found in the apparatus. Copying the one-touch app is stopped."

If the determination result in S62 is Yes, the app copying unit 124 determines whether or not the box 132 found in S60 is associated with an instruction description (S64). If the determination result in S64 is Yes, the app copying unit 124 compares the hash value of the processing content of the instruction description with the hash value included in the backup data (S66), and determines whether or not the hash values match each other (S68).

If the determination result in S68 is Yes, the app copying unit 124 copies the one-touch app 136 in the backup data to the storage device 130 in S26 in FIG. 12. At that time, the app copying unit 124 sets identification information of the box 132 found in S60, as identification information of the output-destination box 132 for the processing result of the one-touch app 136.

If the determination result in S68 is No, the app copying unit 124 causes the process to proceed to S40 in the procedure in FIG. 8. In this case, in S26 executed after S46, S52, or the like, the app copying unit 124 sets identification information of the box 132 found in S60, as identification information of the output-destination box 132 for the processing result of the one-touch app 136.

If the determination result in S64 is No, that is, if the box 132 found in S60 is not associated with an instruction description, the app copying unit 124 provides a selection screen (not illustrated) to the client PC 200 through the client UI unit 126 (S70). On the selection screen, a message indicating that "The box of the same owner in the apparatus is not associated with an instruction description. Select a process, which is to be performed, among the following options," and an inquiry about whether the one-touch app 136 included in the backup data is to be copied or the copy operation is to be stopped are displayed. When, in response to the inquiry, a user selects whether or not the copy operation is to be performed, the app copying unit 124 performs the process corresponding to the selection result (S72).

Figure 13:
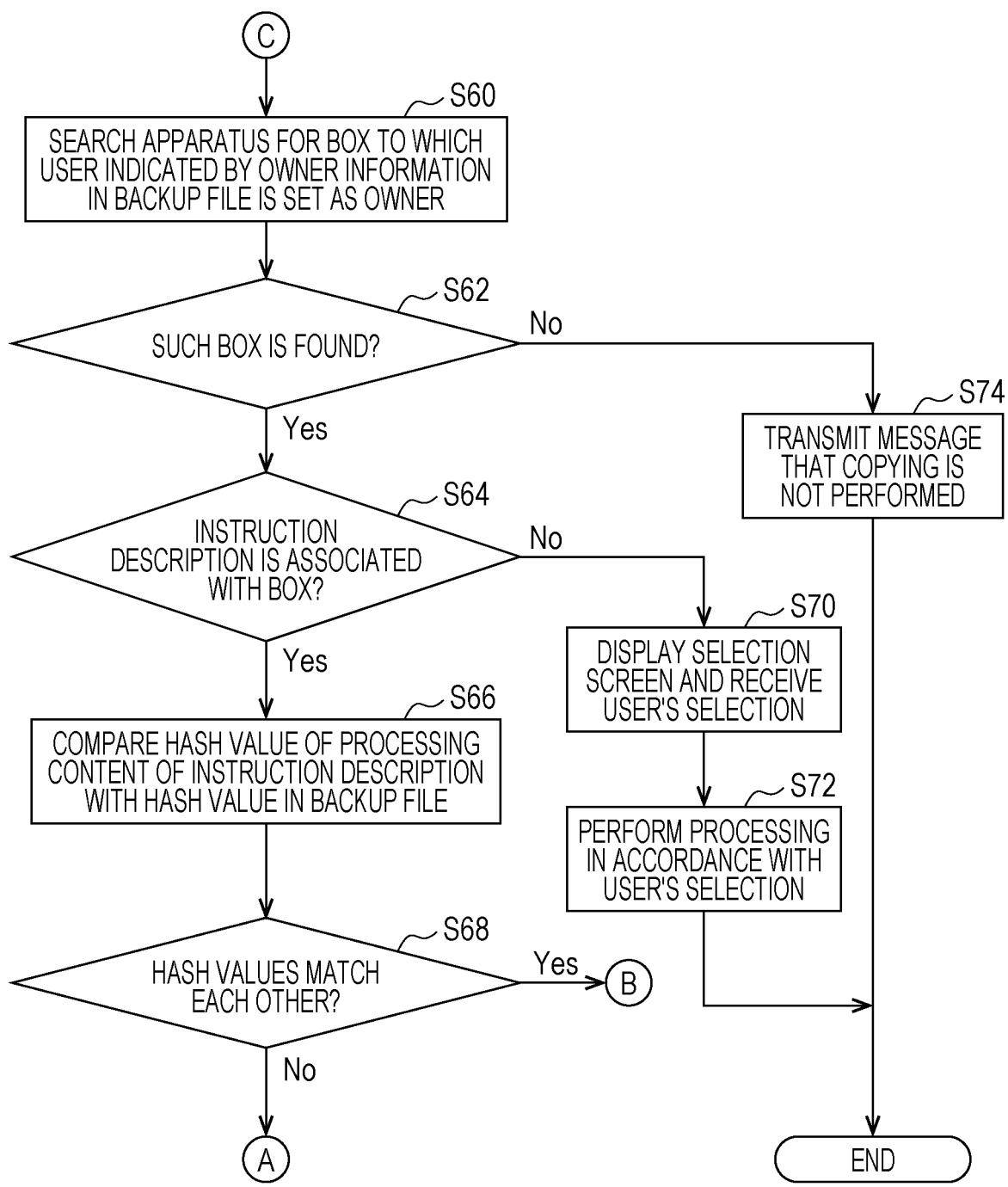
FIG. 13 is a diagram illustrating an exemplary subroutine for a procedure of an app copying unit in an apparatus according to the second modified example.

As a modified procedure of the procedure in FIG. 13, if multiple boxes 132, whose owner is the user indicated by the owner information in the backup data in S62, are found, the following process may be performed. That is, in this case, if, among the found boxes 132, there is a box 132 associated with the instruction description of the processing content whose hash value is the same as that in the backup data, the box 132 is selected, and is set as the output destination of the copied one-touch app 136.

The process according to the second modified example described above is based on the process according to the exemplary embodiment described in FIGS. 6 to 8. The process according to the second modified example may be based on the first modified example described in FIGS. 9 and 10.

THIRD MODIFIED EXAMPLE

In the exemplary embodiment and the modified examples described above, the controller 120 of an apparatus 100 exerts control for copying a one-touch app 136 between apparatuses 100. This is just exemplary. As another example, the client PC 200 operated by a user may exert control for copying a one-touch app 136.

Figure 14:
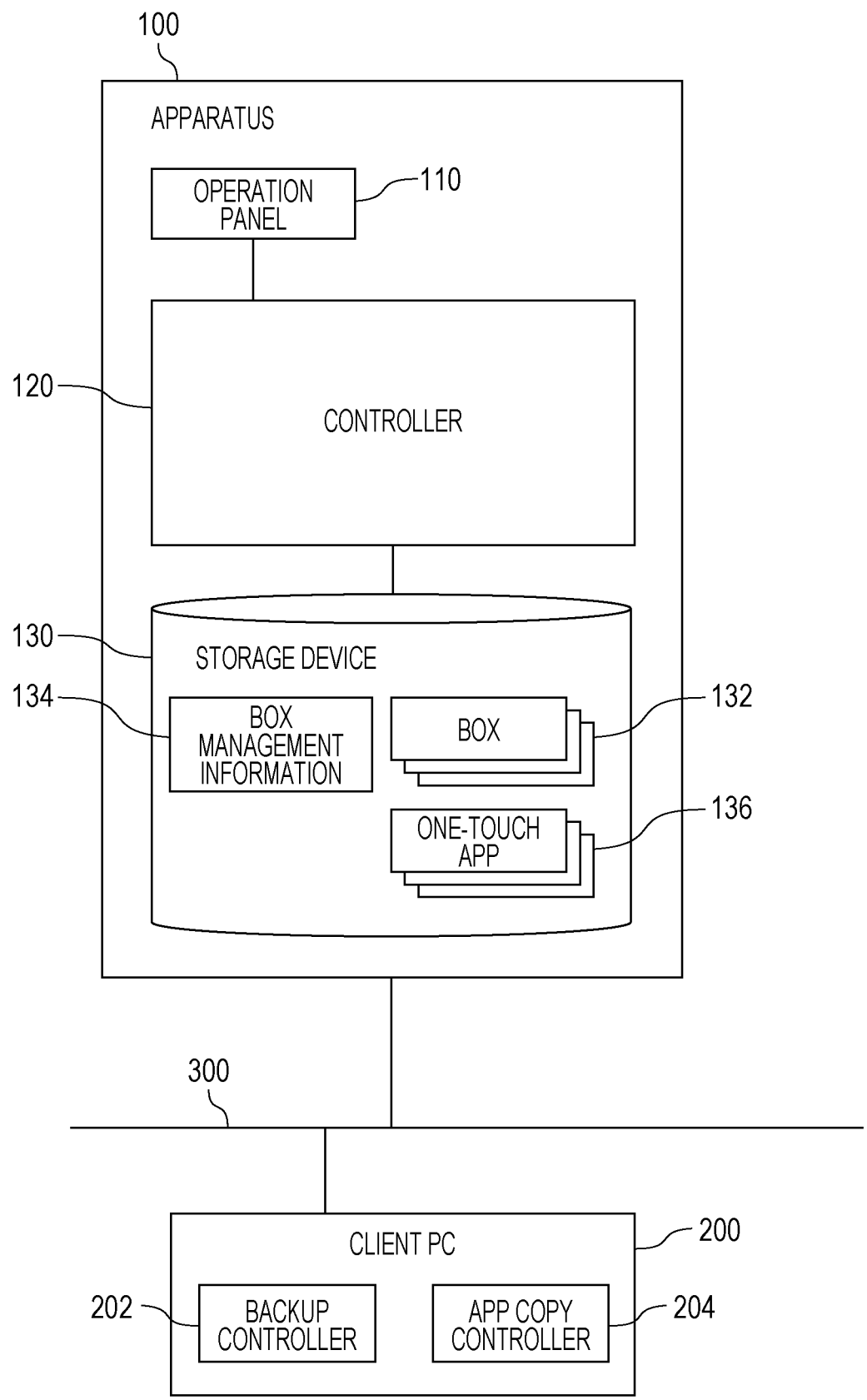
FIG. 14 is a diagram illustrating an exemplary system according to a third modified example.

In the third modified example, as illustrated in FIG. 14, the process of backing up a one-touch app 136 in a certain apparatus 100 is controlled by a backup controller 202 in the client PC 200. The process of copying the backed-up one-touch app to a different apparatus 100 is performed by an app copy controller 204 in the client PC 200.

The backup controller 202 provides a UI screen for backing up a one-touch app 136, to a user who operates the client PC 200. On the UI screen, for example, a list of the apparatuses 100 on the network 300 is displayed. Selection of an apparatus 100 including a one-touch app 136, which is to be backed up, from the list is received. When a user selects an apparatus 100 from the list, the backup controller 202 requests a list of the one-touch apps 136 from the apparatus 100. The controller 120 of the apparatus 100, which has received the request, responds with information indicating a list of the one-touch apps 136 in the storage device 130. The backup controller 202 receives the information, and displays a list of the one-touch apps 136 indicated by the information. Then, the backup controller 202 receives selection of a backup target from the list. When the user selects a one-touch app 136 that is to be backed up, the backup controller 202 obtains data about the selected one-touch app 136 from the apparatus 100. The backup controller 202 analyzes the obtained one-touch app 136 (this process corresponds to S14 in FIG. 6). If the analysis indicates that a box 132 is assigned as the output destination of the processing result of the one-touch app 136, the backup controller 202 requests the apparatus 100 for the instruction description associated with the box 132. In response to the request, if the box 132 is associated with an instruction description, the controller 120 of the apparatus 100 responds to the backup controller 202 with the hash value of the processing content in the instruction description. If not, the controller 120 responds with a message that there are no associated instruction descriptions. If the apparatus 100 responds with the hash value, the backup controller 202 generates a file of backup data including the one-touch app 136 and the hash value and stores the generated file. If the message that there are no associated instruction descriptions is received from the apparatus 100, the backup controller 202 generates a file of backup data including the one-touch app 136 and stores the generated file. The backup controller 202 is an exemplary acquiring unit which acquires backup data.

When the app copy controller 204 receives a user's instruction to copy the backup data, the app copy controller 204 displays a list of stored backup data, and receives selection of backup data that is to be copied, from the user. The app copy controller 204 displays a list of the apparatuses 100 on the network 300, and receives selection of a copy-destination apparatus 100, from the list. Then, the app copy controller 204 analyzes the one-touch app 136 in the selected backup data. If the analysis indicates that a box 132 is assigned as the output destination of the processing result of the one-touch app 136, the app copy controller 204 requests the apparatus 100, which is selected as the copy destination, for the instruction description associated with the box 132. In response to the request, if the box 132 is associated with an instruction description, the controller 120 of the apparatus 100 responds to the app copy controller 204 with the hash value of the processing content of the instruction description. If not, the controller 120 responds to the app copy controller 204 with a message that there are no associated instruction descriptions. If the apparatus 100 responds with the hash value, the app copy controller 204 compares the hash value in the response with the hash value in the backup data. If the two hash values match each other, the app copy controller 204 instructs the apparatus 100 to copy the one-touch app 136 in the backup data. The controller 120 of the apparatus 100, which has received the instruction, stores the one-touch app 136 in the storage device 130. If the two hash values do not match each other, the app copy controller 204 displays a selection screen similar to that in S40 in FIG. 8, and receives the user's selection. According to the user's selection result, the app copy controller 204 performs a process similar to that in FIG. 8. The app copy controller 204 is an exemplary copy unit.

The functions of the backup controller 202 and the app copy controller 204 of the client PC 200 according to the third modified example may be installed in an apparatus 100.

In the exemplary embodiment and the modified examples described above, the hash value of processing content data is used as processing specifying information for specifying the processing content of the instruction description. However, this is merely an example. Instead of this, for example, the data itself of the processing content may be used as processing specifying information.

As described above, a one-touch app 136 is taken as an example of a backup and copy target. The processes according to the exemplary embodiment and the modified examples may be applied also to operations of backing up and copying an information processing component other than a one-touch app 136. Examples of an information processing component other than a one-touch app 136 include a combination of identification information of a function of an apparatus 100, which is used for processing, and setting information for the function.

The information processing mechanism of the apparatus 100, and the client PC 200 according to the exemplary embodiment and the modified examples described above are implemented by causing a computer to execute programs describing the above-described functions of the components included in the apparatus 100 or the client PC 200. For example, as hardware, the computer has a circuit configuration in which a processor, memories (primary memories), such as a random-access memory (RAM) and a read-only memory (ROM), a controller for controlling fixed storage devices, such as a flash memory, a solid state drive (SSD), and a hardware disk drive (HDD), various input/output (I/O) interfaces, a network interface for exerting control for establishing a connection with a network such as a local area network, and the like are connected, for example, through a bus. Programs describing the processing content of the functions are stored in a fixed storage device such as a flash memory over a network or the like, and are installed in the computer. The programs stored in the fixed storage device are read into the RAM, and are executed by the processor. Thus, the functional modules described above as an example are implemented.

The processor indicates a processor in a broad sense, and includes a general-purpose processor (for example, a central processing unit (CPU)) or a dedicated processor (for example, a graphics processing unit (GPU), an application specific integrated circuit (ASIC), a field programmable gate array (FPGA), or a programmable logic device).

Operations of the processor according to the exemplary embodiment and the modified examples described above may be performed, not only by a single processor, but also through collaboration between multiple processors located at physically distant positions. In addition, the order of execution of the operations of the processor (that is, the operations of the components in FIG. 1 which are implemented through operation of the processor) is not limited only to the order described in the exemplary embodiment and the modified examples described above, and may be changed appropriately.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An apparatus comprising:
a generating unit that generates and outputs first backup data including an information processing component and processing specifying information, the information processing component being included in the apparatus and including identification information of a save area storing processing result data obtained through execution of a process defined by the information processing component, the processing specifying information uniquely identifying a process which is to be applied to the processing result data stored in the save area, the save area being included in the apparatus and being indicated by the identification information; and
a copy unit that, when a person inputs an instruction to copy second backup data to the apparatus, the second backup data being generated by the generating unit of a different apparatus, if a first process matches a second process, the first process being applied to processing result data stored in a first save area, the first save area being included in the apparatus and being indicated by the identification information included in the information processing component in the second backup data, the second process being identified by using the processing specifying information included in the second backup data, copies the information processing component in the second backup data to the apparatus, and that, if the first process is different from the second process, transmits a notification to the person.

2. The apparatus according to claim 1,
wherein the copy unit presents the person with an inquiry, as the notification, about whether or not association between the first save area and the first process is to be canceled, and, when the person responds to the inquiry with a message that the association is to be canceled, cancels the association between the first save area and the first process and copies the information processing component in the second backup data to the apparatus.

3. The apparatus according to claim 1,
wherein the first backup data generated by the generating unit further includes communication address information of the apparatus,
wherein the copy unit presents the person with an inquiry, as the notification, about whether or not the process applied to the processing result data stored in the first save area is to be changed from the first process to the second process, and
wherein, when the person responds to the inquiry with a message that the process is to be changed, the copy unit uses the communication address information of the different apparatus to obtain, from the different apparatus, processing content information defining process content of the second process, the communication address information of the different apparatus being included in the second backup data, and the copy unit associates the obtained processing content information with the first save area in such a manner that the second process is applied to the processing result data stored in the first save area.

4. The apparatus according to claim 2,
wherein the first backup data generated by the generating unit further includes communication address information of the apparatus,
wherein the copy unit presents the person with an inquiry, as the notification, about whether or not the process applied to the processing result data stored in the first save area is to be changed from the first process to the second process, and
wherein, when the person responds to the inquiry with a message that the process is to be changed, the copy unit uses the communication address information of the different apparatus to obtain, from the different apparatus, processing content information defining process content of the second process, the communication address information of the different apparatus being included in the second backup data, and the copy unit associates the obtained processing content information with the first save area in such a manner that the second process is applied to the processing result data stored in the first save area.

5. The apparatus according to claim 1,
wherein the first backup data generated by the generating unit further includes processing content information defining processing content of the process applied to the processing result data stored in the save area, the save area being indicated by the identification information and being included in the apparatus,
wherein the copy unit presents the person with an inquiry, as the notification, about whether or not the process applied to the processing result data stored in the first save area is to be changed from the first process to the second process, and
wherein, when the person responds to the inquiry with a message that the process is to be changed, the copy unit associates the processing content information of the second process included in the second backup data, with the first save area in such a manner that the second process is applied to the processing result data stored in the first save area.

6. The apparatus according to claim 2,
wherein the first backup data generated by the generating unit further includes processing content information defining processing content of the process applied to the processing result data stored in the save area, the save area being indicated by the identification information and being included in the apparatus,
wherein the copy unit presents the person with an inquiry, as the notification, about whether or not the process applied to the processing result data stored in the first save area is to be changed from the first process to the second process, and
wherein, when the person responds to the inquiry with a message that the process is to be changed, the copy unit associates the processing content information of the second process included in the second backup data, with the first save area in such a manner that the second process is applied to the processing result data stored in the first save area.

7. The apparatus according to claim 1,
wherein the first backup data generated by the generating unit further includes user identification information of a user associated with the save area, the save area being indicated by the identification information and being included in the apparatus, and wherein, when the user identification information included in the second backup data is different from the user identification information of a user associated with the first save area, the copy unit transmits a notification to the person.

8. The apparatus according to claim 7,
wherein, when the user identification information included in the second backup data is different from the user identification information of the user associated with the first save area, if a save area is found among a plurality of save areas in the different apparatus, the found save area being an area which is associated with user identification information identical to the user identification information included in the second backup data and in which a process identical to the second process is applied to the stored processing result data, the copy unit overwrites the identification information in the information processing component in the second backup data with the identification information of the found save area, copies the information processing component in the second backup data to the apparatus, and notifies the person that the processing result data obtained through execution of the information processing component is to be stored in the found save area.

9. A non-transitory computer readable medium storing a program causing a computer to execute a process, the computer being included in an apparatus, the process comprising:
generating and outputting first backup data including an information processing component and processing specifying information, the information processing component being included in the apparatus and including identification information of a save area storing processing result data obtained through execution of a process defined by the information processing component, the processing specifying information uniquely identifying a process which is to be applied to the processing result data stored in the save area, the save area being included in the apparatus and being indicated by the identification information; and when a person inputs an instruction to copy second backup data to the apparatus, the second backup data being generated by a different apparatus, if a first process matches a second process, the first process being applied to processing result data stored in a first save area, the first save area being included in the apparatus and being indicated by the identification information included in the information processing component in the second backup data, the second process being identified by using the processing specifying information included in the second backup data, copying the information processing component in the second backup data to the apparatus, and, if the first process is different from the second process, transmitting a notification to the person.

10. A non-transitory computer readable medium storing a program causing a computer to execute a process comprising:
acquiring backup data including an information processing component and processing specifying information, the information processing component being included in a first apparatus and including identification information of a save area storing processing result data obtained through execution of the information processing component, the processing specifying information uniquely identifying a first process applied to the processing result data stored in the save area, the save area being included in the first apparatus and being indicated by the identification information; and
copying the information processing component in the backup data to a second apparatus in response to an instruction from a person,
wherein, when a second process is different from the first process, the second process being applied to data stored in a second-apparatus save area, the second-apparatus save area being included in the second apparatus and being indicated by the identification information, the first process being specified by using the processing specifying information, the copying includes transmitting a notification to the person.

* * * * *